United States Patent [19]
Reed

[11] Patent Number: 4,891,511
[45] Date of Patent: Jan. 2, 1990

[54] FIBER OPTIC MICROBEND SENSOR WITH BRAIDED FIBERS

[75] Inventor: Stuart E. Reed, Homeworth, Ohio

[73] Assignee: The Babcock & Wilcox Co., New Orleans, La.

[21] Appl. No.: 238,695

[22] Filed: Aug. 31, 1988

[51] Int. Cl.[4] ............................................. H01J 5/16
[52] U.S. Cl. ................................. 250/227; 250/231 R
[58] Field of Search ........................... 250/227, 231 R; 350/96.29, 96.15; 73/705, 800

[56] References Cited

U.S. PATENT DOCUMENTS

| | | | |
|---|---|---|---|
| 4,163,397 | 8/1979 | Harmer | 73/800 |
| 4,309,618 | 1/1982 | Carter, Jr. et al. | 250/561 |
| 4,342,907 | 8/1982 | Macedo et al. | 250/227 |
| 4,360,247 | 11/1982 | Beasley | 350/96.15 |
| 4,382,335 | 5/1983 | Frank | 33/125 B |
| 4,407,561 | 10/1983 | Wysocki | 350/96.3 |
| 4,421,979 | 12/1983 | Asawa et al. | 250/227 |
| 4,449,210 | 5/1984 | Myer | 367/149 |
| 4,459,477 | 7/1984 | Asawa et al. | 250/227 |
| 4,463,254 | 7/1984 | Asawa et al. | 250/231 R |
| 4,477,725 | 10/1984 | Asawa et al. | 250/231 R |
| 4,487,206 | 12/1984 | Aagard | 128/667 |
| 4,495,819 | 1/1985 | Tekippe | 73/705 |
| 4,514,054 | 4/1985 | Stowe | 350/96.29 |
| 4,530,078 | 7/1985 | Lagakos et al. | 367/149 |
| 4,560,016 | 12/1985 | Ibanez et al. | 177/210 R |
| 4,568,408 | 2/1986 | Schmadel et al. | 156/626 |
| 4,577,100 | 3/1986 | Meltz et al. | 250/231 P |
| 4,592,932 | 6/1986 | Biswas et al. | 427/163 |
| 4,618,764 | 10/1986 | Harmer | 73/705 |
| 4,621,896 | 11/1986 | Lagakos et al. | 350/96.29 |
| 4,708,019 | 11/1987 | Rubner et al. | 73/760 |
| 4,719,803 | 1/1988 | Capelle et al. | 73/784 |
| 4,724,316 | 2/1988 | Morton | 250/231 R |
| 4,812,014 | 3/1989 | Sawano et al. | 350/96.29 |

OTHER PUBLICATIONS

"Fiber Optic Pressure Sensor", J. N. Fields, C. K. Asawa, O. G. Raimer and M. K. Barnoski, from *J. Acoust. Soc. Am.*, 67(3), Mar., 1980, pp. 816–818.

"High Temperature Fiber Optic Pressure Sensor", J. W. Berthold, presented at the 30th International Instrumentation Symposium–Denver, Colorado, May 8, 1984.

*Primary Examiner*—David C. Nelms
*Attorney, Agent, or Firm*—Vytas R. Matas; Robert J. Edwards; Daniel S. Kalka

[57] ABSTRACT

A fiber optic microbend sensor with a braided arrangement of multiple optical fibers (or fibers and fillers) 16 such that the length dependent microbending losses result from the interaction of the fibers 10 themselves (or the fibers and fillers) without the need for additional external structures such as corrugated plates 12, 14. A plurality of fibers with at least one of the fibers being an optical fiber 10 are braided together into an interwoven strand 16 to produce the fiber optic microbend sensor. The spatial bend frequency of the braid 16 corresponds to the optimum microbend frequency for the fiber 10.

7 Claims, 2 Drawing Sheets

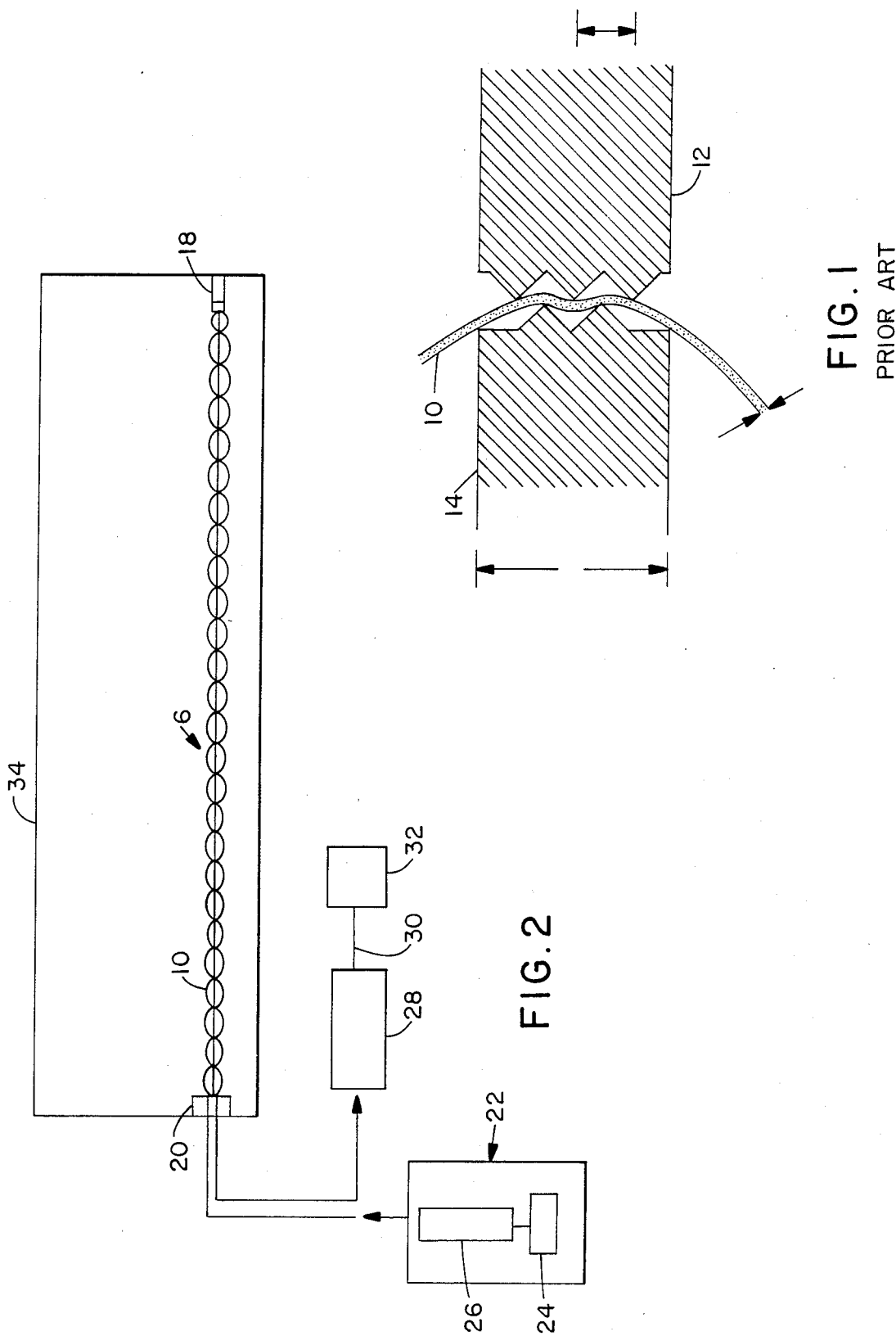

FIBER OPTIC MICROBEND SENSOR WITH BRAIDED FIBERS

BACKGROUND OF THE INVENTION

1. Field of the Invention

The present invention relates generally to a fiber optic microbend sensor, and in particular, it is directed to a braided fiber optic microbend sensor for the measurement of displacement, strain, or elongation.

2. Description of the Related Art

Extensometers are devices used to measure displacement or length changes of structural members or test articles due to mechanical or thermal loads. Typically, an extensometer is attached to the two points between which the change in length is expected. The physical changes in length are then converted to an electronic, optical, or magnetic signal proportional to the length change.

Commercially available extensometers may be based on measurement of differential capacitance, motion of a magnetic core such as an LVDT or DCDT, measurement of strain, rotation of a potentiometer, and other means to achieve the desired sensitivity over the required gage length. An apparatus and method for performing extensometry using fiber optics is a microbend sensor, as shown in FIG. 1. In this sensor, the optical fiber 10 (consisting of a core, cladding and buffer coating) is clamped between two sets of opposing corrugations 12, 14. Changes in the length of the structure (not shown) to which the corrugated members 12, 14 are attached changes the separation of the corrugations and thereby bending of the optical fiber between the corrugations. Light is propagated through the core of the fiber; some of the light is lost from the core to the cladding through mode conversion as a result of the microbending between the corrugations, causing change in intensity of the light exiting the fiber 10. This change in intensity can be readily related to the change in separation of the corrugations, i.e., intensity change is proportional to the change in separation.

The technical paper, "Fiber Optic Pressure Sensor", J. N. Fields, C. K. Asawa, O. G. Raimer and M. K. Barnowski, J. Acoust. Soc. Am. 67(3), March, 1980, at pages 816-818, teaches that is known to apply a succession of axial bends to an optical fiber by means of a pair of corrugated plates to attenuate the intensity of light transmitted along the fiber. Likewise, U.S. Pat. Nos. 4,421,979; 4,459,477; 4,477,725; and 4,463,254 all issued to Asawa, et al teach of the application of microbend force transducers using the principle illustrated in FIG. 1 applied to long structures such as oil and gas pipeline and the like.

In a similar fashion, U.S. Pat. No. 4,568,408 to Schmadel, et al relates to a fiber optic energy sensor and optical demodulation system. It teaches that if a single mode optical fiber is compressed radially, or stretched, or compressed longitudinally, then the optical path length for electro-magnetic radiation traveling in the core of a single mode optical fiber changes.

Microbend sensors in general offer the advantages of being simple, low cost, immune to electro-magnetic interference, operable over wide ranges of temperature, pressure and other environmental conditions. In addition, good performance can be obtained with relatively simple opto-electronics.

In the past fiber optic microbend technology required additional external structures such as corrugated plates. These additional external structures add cost in terms of material and time. There is a need for a fiber optic microbend sensor which is simple, accurate, and readily attaches to structures, that does not require precision in the attachment and is low cost. Additionally, this fiber optic microbend sensor must provide all the advantages of fiber optic microbend sensors over conventional electromagnetic sensors.

SUMMARY OF THE INVENTION

The present invention provides an improved fiber optic microbend sensor which incorporates the inherent advantages of fiber optic microbend sensors and which provides essentially unlimited gage length coupled with sensitivity and repeatability. Unlike conventional microbend sensors, the present invention does not require additional external structures such as corrugated plates. Rather, the central concept of this invention is the arrangement of multiple optical fibers (or fibers and fillers) such that the length dependent microbending losses result from the interaction of the fibers themselves (or the fibers and fillers).

The present invention is directed to a fiber optic microbend sensor comprising a plurality of fibers braided together into an interwoven strand with at least one of the fibers being an optical fiber. The strand is tensioned and attached to a workpiece or structure. The spatial bend frequency of this braided strand corresponds to the optimum microbend frequency for the fiber. An optical signal is applied to each of the optical fibers and modulations of the optical signals transmitted through each of the optical fibers are detected.

A second aspect of the present invention is the method for measuring displacement with the fiber optic microbend sensor comprising the steps of braiding together a plurality of fibers with at least one of the fibers being an optical fiber, attaching the braided fiber to a workpiece, applying an optical signal to each of the optical fibers and detecting the modulations in the optical signal transmitted through each optical fiber.

Advantageously, the present invention provides all of the advantages of conventional fiber optic microbend sensors over conventional electromagnetic sensors such as simplicity, low cost, immunity to electromagnetic interference, immunity to potential differences, operability over wide temperature ranges and operating environments, and uses simple and low cost optical-electronics.

Additionally, the present fiber optic microbend sensor includes the following advantages listed as follows:

it is a high compliance device, i.e., does not impose significant loads on the structure being measured, thus making it applicable to thin relatively flexible members such as large space structures;

it is readily attached to structures, the attachments are non precision and low cost, and adhesive methods may be used;

it has essentially unlimited gage length as well as good sensitivity and range, the sensitivity of the fiber optic microbend sensor can be increased with the addition of fibers to the braid; and while the output of the fiber optic microbend sensor is non-linear with displacement, it is highly repeatable and, thus, can be linearized in a straight forward manner with analog or microprocessor based electronics.

The various features of novelty which characterize the invention are pointed out with particularity in the claims annexed to and forming part of this disclosure. For a better understanding of the present invention, its operating advantages and specific results obtained by its uses, reference is made to the accompanying drawings and descriptive matter in which a preferred embodiment of the invention is illustrated.

BRIEF DESCRIPTION OF THE DRAWINGS

In the drawings:

FIG. 1 is a side view in section showing a conventional fiber optic microbend sensor;

FIG. 2 is a side view of one embodiment of the present invention illustrating a three-strand braided fiber optic microbend sensor as it is used to measure elongation of a strut or a workpiece;

DESCRIPTION OF THE PREFERRED EMBODIMENT

Figure 3:
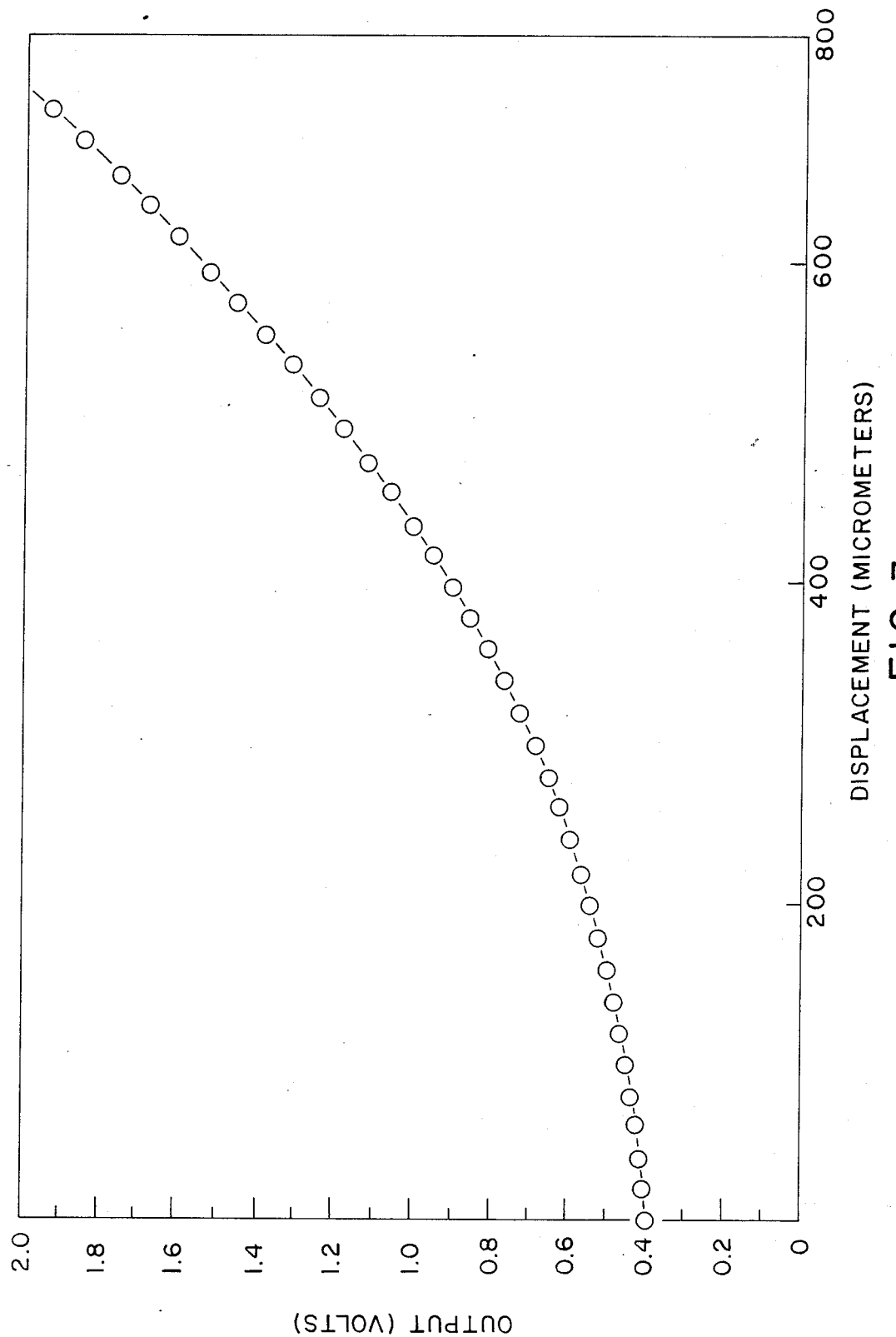
FIG. 3 is a graph plotting output in volts versus displacement in micrometers for a fiber optic microbend elongation sensor with a braided fiber length of 0.7 meters.

Referring first to FIG. 2, wherein like numerals designate the same element throughout the several drawings, there are three fibers with at least one fiber being an optical fiber 10 braided together into an interwoven strand or braid 16. In the preferred embodiment, the spatial bend frequency of the braid 16 corresponds to the optimum microbend frequency for the optical fiber 10. The spatial bend frequency is thus set to obtain the greatest amount of microbending loss in the optical fiber. This maximizes the sensitivity to changes in length. Alternatively, under some circumstances, it may be beneficial to decrease the sensitivity to changes in length (e.g., to increase the range of measurement) through using a spatial bend frequency for the braid which is either greater or less than the optimum spatial bend frequency for the optical fiber used.

The braid or strand 16 is then attached to a workpiece or structure to be measured at attachment points 18 and 40 tensioned with a tension adjustment 20. Alternatively, the braid or strand 16 may be held in the desired level of tension by a tensioning means prior to and during its attachment to the workpiece or structure; the tensioning means may then be removed following the attachment thus eliminating the tensioning means as a potential source of error and permitting a single tensioning means 20 to be used to install multiple braids. The braid 10 is thus preloaded in tension when installed on the workpiece or structure. This establishes the zero or reference length of the braid 10 and permits the measurement of both increases and decreases in the length of the workpiece or structure. Alternatively, if the direction of the change in length to be measured is known in advance, the initial tension may be adjusted to produce the maximum range or sensitivity for the measurement.

An optical signal applying means 22 is a source to provide light into each of the active optical fibers as is illustrated by the arrow in entering optical fiber 10 in FIG. 2. The light exiting the optical fiber 10 is directed to a photo-detector 28 which measures the intensity of the optical signal transmitted through the optical fiber 10. Conveniently, the optical signal applying means 22 includes a light source 24 and a light splitting means 26 connected to one end of each optical fiber 10 for simultaneously applying the optical signal. Suitable light sources include a light emitting diode (LED), laser, or laser diode. The detection means may include any means of detecting changes in the intensity of the optical signal at the wavelength of the optical signal applying means, such as a photodiode. An example of the light splitting means 26 includes a 3 db coupler with the aid of known optical splices. A beneficial arrangement of the splitting means includes a provision for a portion of the signal from the optical applying means to pass directly to a reference photodetector without passing through the optical fiber 10. The signal from the photodetector 28 may then be ratioed to the signal from the reference photodetector to provide an output signal which is independent of any source intensity variations.

The degree of sensitivity to microbend loss depends on the wavelength of the light employed and the fiber characteristics; these establish the optimum spatial bend frequency for maximum attenuation as a result of microbending. The sensitivity of the braid or strand 16 can be altered by changing these parameters, or through changing the physical parameters of the braid. For a given spatial bend frequency, the longer the braid is, the greater the sensitivity is because of the larger number of spatial bends. Conversely, a shorter braid has less sensitivity because the number of spatial bends is less. Similarly, increasing the number of active optical fibers in the braid increases the number of spatial bends; i.e., for a given length and spatial bend frequency, a braid with two active optical fibers has twice the sensitivity of a braid with a single active optical fiber. The sensitivity of the braid or strand 16 may also be altered or adjusted through means which increase or decrease the amount of microbending which occurs as a result of a given change in length of the braid 16; such means include changing the relative stiffness of the filler strands relative to the active optical fiber(s).

The output of the photodetector or other intensity detection means may be directed to some form of recording or graphing instrument (not shown) to provide a permanent record of any changes in length. Also, a microprocessor 32 or other suitable linearizing electronics connected to the photodetector 28 via the transmission line linearizes the output of the photodetector for easy calculations or display.

As the structure of the workpiece or strut 34 changes length between points 20 and 18, the braid 16 tightens or loosens resulting in a change in the microbending loss in the optical fiber 10. The light which was launched through the fiber changes in intensity as a result of the change in the microbend losses. This is readily related to the change in the length of the braid 16 through the microprocessor 32, or other electronic means, and thereby to the change in length of the structure or workpiece to which the braid is attached.

The braid or strand 16 comprises a plurality of fibers with at least one of the fibers being an optical fiber 10. It can be seen that the plurality of optical fibers which comprise the braid 16 may consist of a single optical fiber 10 which is folded or bent back upon itself one or more times, such that with a suitable braiding means, the same continuous optical fiber 10 makes two or more passes through the braid 16 structure to provide increased sensitivity while simplifying the application of the sensor by decreasing the number of splitting means and optical splices required. This method may also be used to place the optical applying means and detecting means at the same or opposite ends of the braid 16 as may be required for a specific application.

The braid can be readily embedded, suiting it for application in composite materials, cast refractories or concrete. It can be readily protected from mechanical damage with a simple tube, or by coating the braid with a compliant coating such as a silicon rubber.

An aluminum coated glass-on-glass fiber is preferred, but any optical fiber which demonstrates microbending losses is suitable, including polyimide or plastic coated glass-on-glass or plastic optical fiber. The remaining fibers can be made of any suitable material that allows for braiding. For applications where the optimum sensitivity is unknown, it can be seen that it is beneficial for all of the fibers to be optical fibers, thus permitting the user to select the number of fibers which will be active and the number which will act only as fillers to achieve the required sensitivity.

While a three-fiber braid is described, additional optical fibers can be readily added, improving sensitivity and permitting the sensor to be fabricated on commercial braiding or stranding equipment. The sensitivity of the fiber optic microbend sensor is increased with the addition of optical fibers to the braid.

FIG. 3 illustrates preliminary calibration data for the distributed microbend elongation sensor. A braided fiber length of 0.70 meters was used for these tests, with two active optical fibers and one filler fiber. The total sensor elongation range is about 1 mm and the response is nonlinear but repeatable over this range. It is straightforward to linearize a sensor output using appropriate microprocessor based electronics such as OMOS integrated circuits to detect and amplify the photodetector signal for example. The worst case response for small displacements about the initial length is approximately 0.1 mv/1,000 nm. The elongation range will scale to about 5 mm for a 3 meter braid (and strut) length. The fiber optic microbend sensor in FIG. 3 had a 2-foot gage length, i.e., length of optical fiber conductor 10, using two active (optical) and one dummy (non-optical) fiber. It had a range of 0.040 inch and a resolution of 0.00002 inch (0.05% of full scale).

The present invention is easily applied to the measurement of strain as well as elongation. Through measurement of strain or displacement, it is also applicable to a variety of transduction applications including position, pressure, flow, or temperature.

While a specific embodiment of the invention has been shown and described in detail to illustrate the application of the principles of the invention, it will be understood that the invention may be embodied otherwise without departing from such principles. One such example is that while the preferred embodiment has shown three optical fibers braided together, another embodiment is one optical fiber with two dummy fibers. Another such example would be to perhaps braid as many as six optical fibers for increased sensitivity, for simplicity and low cost of manufacturing or for flexibility in application.

What is claimed is:

1. A fiber optic microbend sensor, comprising:
   a plurality of fibers braided together into an interwoven strand with at least one of said braided fibers being an optical fiber, said strand being tensioned in application to modulate an optical signal in said optical fiber, said interwoven strand having a spatial bend frequency corresponding to a microbend frequency for each optical fiber to obtain microbending loss in the optical fiber;
   means for applying an optical signal to said optical fiber; and
   means for detecting the modulations of the optical signal transmitted through said optical fiber.

2. A fiber optic microbend sensor according to claim 1, wherein said fibers are a plurality of optical fibers.

3. A fiber optic microbend sensor according to claim 2, wherein said interwoven strand has a spatial bend frequency corresponding to the optimum microbend frequency for the fibers.

4. A fiber optic microbend sensor according to claim 3, wherein said optical signal applying means includes a light source and light splitting means connected to one end of each optical fiber for simultaneously applying an optical signal.

5. A method for measuring displacement, comprising the steps of:
   braiding together a plurality of fibers with at least one of said fibers being an optical fiber;
   tensing the braided fibers in application to modulate an optical signal in said optical fiber;
   applying an optical signal to said optical fiber; and
   detecting the modulations in the optical signal transmitted through said optical fiber.

6. A method according to claim 5, wherein the step of tensing the braided fibers include tensing the braided fibers to a spatial bend frequency corresponding to the optimum microbend frequency for the braided fibers.

7. A method according to claim 5, further comprising the step of simultaneously applying an optical signal to a plurality of optical fibers with a light source and light splitting means.

* * * * *